UNITED STATES PATENT OFFICE.

HENRY H. EAMES, OF OAKLAND, AND ABEL PATCHEN, OF SAN FRANCISCO, ASSIGNORS TO AMERICAN MILL AND METALLURGICAL COMPANY, OF SAN FRANCISCO, CALIFORNIA.

IMPROVEMENT IN PROCESSES FOR TREATING ORES.

Specification forming part of Letters Patent No. 170,535, dated November 30, 1875; application filed April 27, 1875.

*To all whom it may concern:*

Be it known that we, HENRY H. EAMES, of Oakland, and ABEL PATCHEN, of San Francisco city and county, State of California, have invented an Improved Process for Treating Ores containing Gold and Silver; and we do hereby declare the following description and accompanying drawings are sufficient to enable any person skilled in the art or science to which it most nearly appertains to make and use our said invention or improvement without further invention or experiment.

When ore-pulp is treated in iron pans with a chloride of copper the iron of the pan precipitates the copper, so that its effect upon the gold and silver contained in the pulp is lost. To remedy this difficulty, Abel Patchen secured Letters Patent No. 156,464, and dated November 3, 1874, in which he claims the process of treating the pulp in a copper or wooden vessel before introducing it into the iron pan for amalgamation, thus allowing the silver to be chloridized before it enters the iron pan. We have discovered, however, that by employing protochloride of iron we can chloridize the metal contained in the pulp directly in the iron pan without the necessity of providing an extra vessel for the treatment of the pulp. We have also discovered that when the dichloride or subchloride of copper is used in connection with the protochloride of iron in the iron amalgamating-pan the effect of the iron pan on the copper salt is neutralized, so that little or no copper will appear in the amalgam.

In practice, we prefer to employ the protochloride and subchloride of iron and dichloride and subchloride of copper in one treatment and at the same time, as we are able then to obtain a larger quantity of bullion product.

Although the use of the protochloride of iron enables us to treat the ore chemically and without unfavorable results in an iron pan, we can produce superior results, both in the quantity and fineness of the bullion product, by using it in combination with the dichloride or subchloride of copper in the wooden or copper vessel heretofore described and claimed in Patchen's patent, and where the wooden or copper pan is already in use we shall preferably use this process, as being the most successful; but where the iron pans only are in use we shall use them in the iron pan.

While the pulp is being treated we prefer to subject it to a grinding process, so as to more thoroughly comminute the particles, and thus render them more susceptible to the action of the copper and iron salts, and we can at the same time add the quicksilver necessary to accomplish the amalgamation; but, instead thereof, the pulp could be ground after it leaves the battery and before it enters the pan.

In our practical tests we have been able, by the above process, to increase the yield per ton of ore from the Belcher and Consolidated Virginia mines from ten to twenty per cent.

We are thus able to chloridize and amalgamate gold and silver contained in ore-pulp without the necessity of altering the apparatus now in use, and without the requirement of an extra tub or vessel, as it goes from the amalgamator directly to the settler in the ordinary way.

Having thus described our invention, what we claim, and desire to secure by Letters Patent, is—

1. The process of treating ore-pulp with the protochloride of iron and the dichloride or subchloride of copper simultaneously in the same pan, tub, or vessel, substantially as above specified.

2. The process herein described of treating ore-pulp by grinding the ore with the protochloride of iron and dichloride of copper, substantially as and for the purpose described.

HENRY H. EAMES.
ABEL PATCHEN.

In presence of—
CLARK B. CARD,
JOHN H. SIMPSON.